United States Patent

[11] 3,634,805

[72] Inventors Fritz Jestrzemski;
 Dieter Korbus; Gerhard Schulze, all of Berlin, Germany
[21] Appl. No. 28,803
[22] Filed Apr. 15, 1970
[45] Patented Jan. 11, 1972
[73] Assignee Steatit-Magnesia Aktiengesellschaft Lauf a.d. Pegnitz, Germany
[32] Priority May 24, 1969
[33] Germany
[31] G 69 21 039

[54] MINIATURE SPINDLE POTENTIOMETERS AND METHOD FOR PRODUCING SUCH POTENTIOMETERS
7 Claims, 16 Drawing Figs.

[52] U.S. Cl. .................................................... 338/180, 338/183, 29/610
[51] Int. Cl. ....................................................... H01c 9/02
[50] Field of Search ........................................ 338/176, 177, 178, 179, 180, 181, 182, 183; 29/610

[56] References Cited
UNITED STATES PATENTS

| | | | |
|---|---|---|---|
| 2,958,062 | 10/1960 | Barden et al. | 338/180 |
| 3,412,362 | 11/1968 | Woods et al. | 338/183 |
| 3,371,305 | 2/1968 | DeLong et al. | 338/183 X |
| 3,400,355 | 9/1968 | Van Benthuysen | 338/183 |
| 2,777,926 | 1/1957 | Bourns | 338/183 X |
| 2,976,507 | 3/1961 | DiGirolamo et al. | 338/183 X |
| 3,017,565 | 1/1962 | Carson et al. | 338/176 X |

Primary Examiner—Lewis H. Myers
Assistant Examiner—D. A. Tone
Attorney—Ostrolenk, Faber, Gerb & Soffen ABSTRACT: A miniature spindle potentiometer for disturbance-free operation adjacent and generally parallel to adjacent similar potentiometers has a small-area profile of narrow width approaching the profile and width of its spindle. It is composed of simple components which may be rapidly assembled into complete potentiometers. The potentiometer has a special slotted nut having two nut sections of strong elastic and insulating polymer material which are biased into play-free threaded engagement with a rotatable spindle which moves the nut and a contact spring coupled thereto along the spindle. Elongated resistance and contact tracks extending generally parallel to the spindle and transversely to the potentiometer mounting surface are slidingly engaged by the moving contact spring. The elastic material of the slotted nut causes the nut and spindle threads to glide across and over their engaged threads without damage and wear of the nut threads, even while the nut remains stationary in an end position while the spindle continues to rotate at substantial speed. A U-shaped contact spring has two contact arms which contact the parallel resistance and contact tracks, respectively, and its sheet junction section is coupled to the moving nut by interfitting coupling projections and recesses. Thus, the nut has at least one pin projection which enters into a corresponding recess or opening in the sheet junction section of the U-shaped contact spring. All components are of simple shape which make possible their rapid production and assembly on a mass production basis into completed potentiometers. The slotted nut of elastic material enables assembly of all potentiometer components except the spindle within a plastic polymer housing. The threaded spindle is thereafter inserted into the housing and into threaded engagement with the inwardly biased threads of the slot-separated nut sections. The exterior end of the spindle which passes through a passage in a transverse housing wall is surrounded by a housing extension which forms with this exterior spindle end a labyrinthine packing which suppresses entry of dust and other contaminants into the housing interior.

PATENTED JAN 11 1972
3,634,805
SHEET 1 OF 2
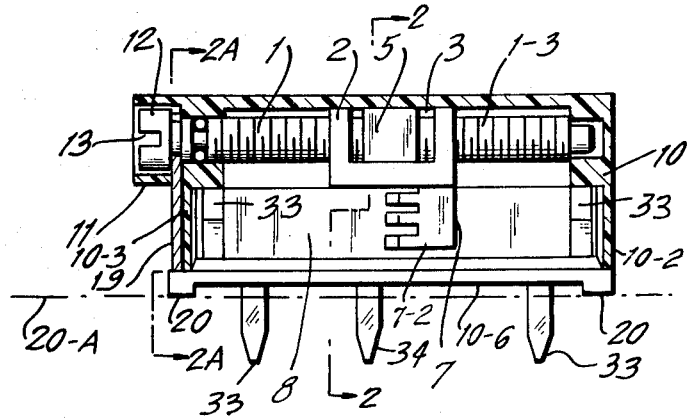
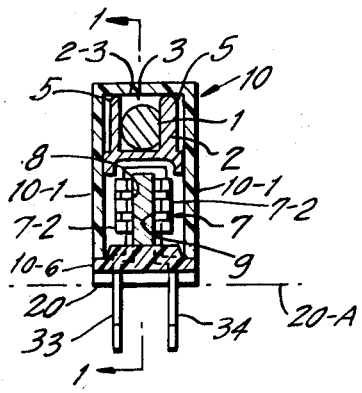
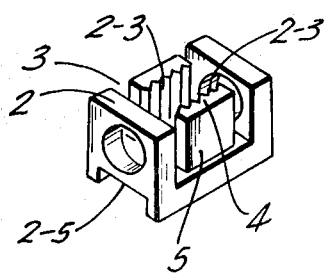
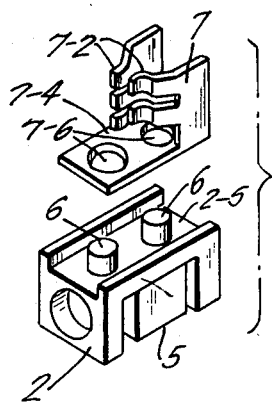
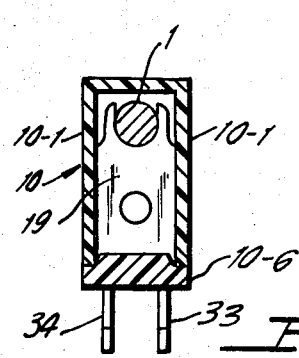
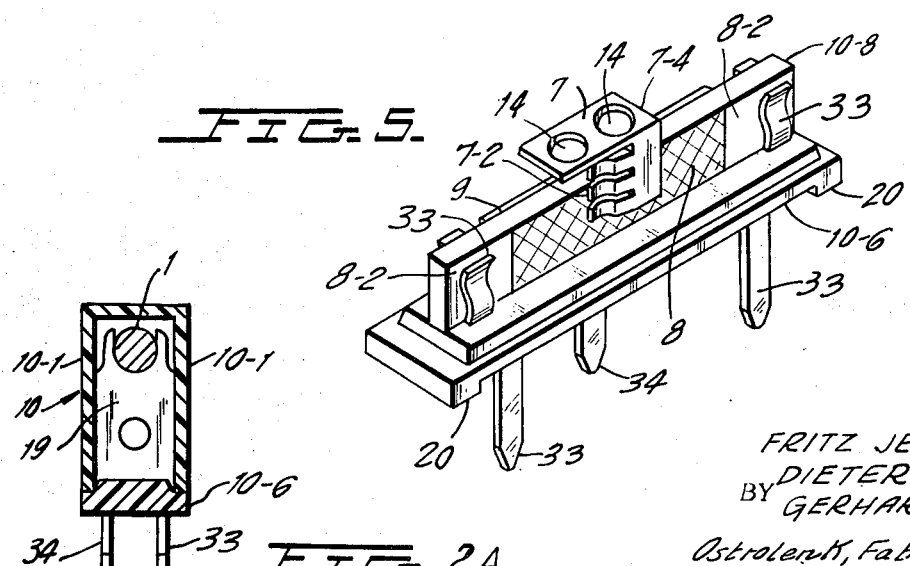
INVENTORS
FRITZ JESTRZEMSKI
DIETER KORBUS
BY GERHARD SCHULZE
Ostrolenk, Faber, Gerb & Soffen
ATTORNEYS

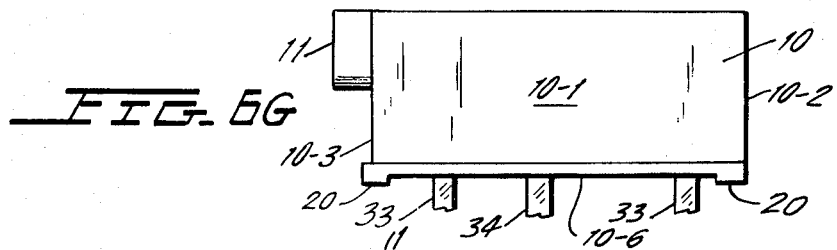
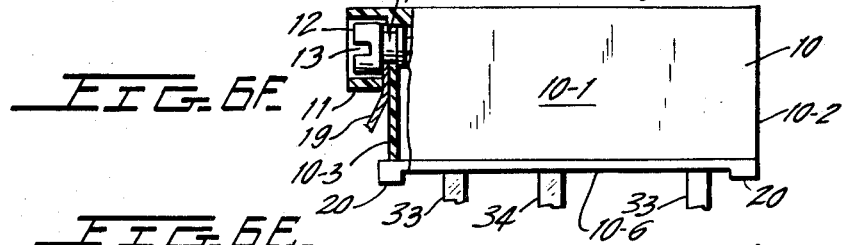
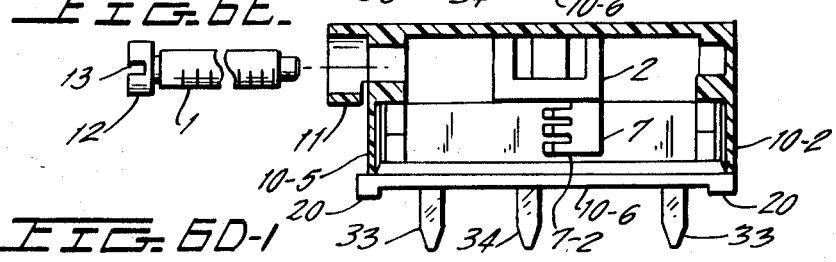
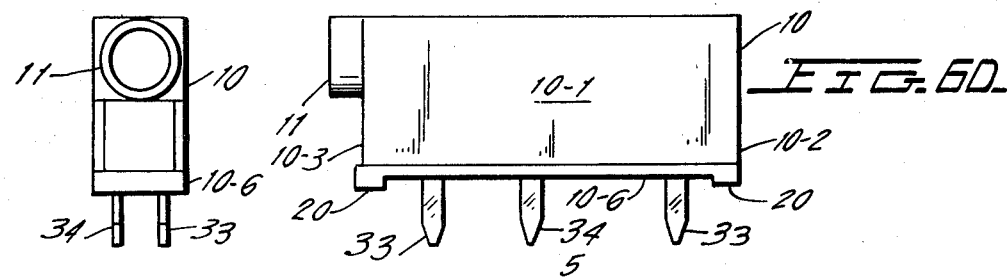
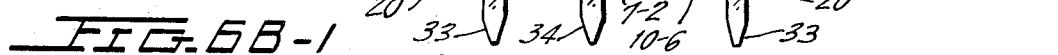
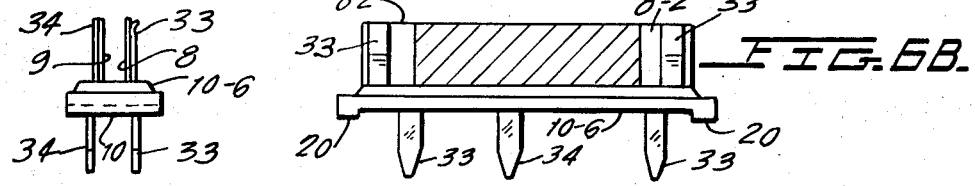
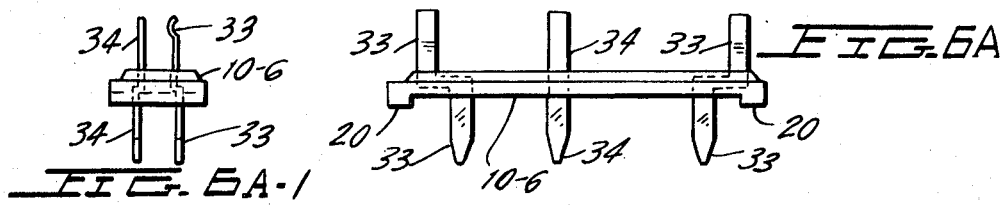
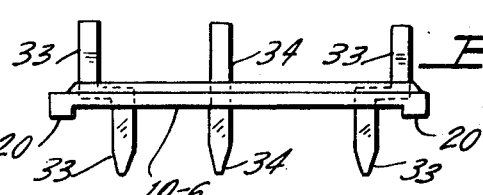

3,634,805

MINIATURE SPINDLE POTENTIOMETERS AND METHOD FOR PRODUCING SUCH POTENTIOMETERS

Miniature spindle potentiometers having, for example, a profile width of only 5 mm. (millimeter) should have simple components which may be assembled on a mass production basis with a minimum of simple steps into completed potentiometers.

The spindle with its threaded nut constitute the most essential mechanical components of the potentiometer, and they are responsible for its trouble-free operation with a minimum wear during a long life. Accordingly, preferential efforts have been devoted in the past to assure simple threaded engagement of the spindle with the nut and to their assembly with the other components within the potentiometer housing on a mass production basis.

Such miniature potentiometers must be able to solve two problems:

a. The positioning of a plurality of potentiometers adjacent and parallel to and with a minimum spacing from each other and free from extraneous disturbances; and b. The rapid assembly of their components with a minimum of steps in the housings.

Object (a) is achieved by providing simple potentiometer components which may be confined within a small profile of narrow width approaching the profile of the spindle while assuring disturbance-free operation.

Object (b) is solved, in the first instance, with a slotted nut having two nut sections embodying elastic material which bias their inward threads into positive play-free engagement with the spindle threads. Furthermore, the elastic nut material enables the engaged nut and spindle threads to glide across and over each other without damage or substantial wear of the nut threads even when the nut must remain stationary in an end position while the spindle rotates at substantial speed.

The nut has to move a contact spring in sliding contact engagement with a resistance track and a parallel contact track which extend generally transversely or perpendicularly to the mounting surface of the potentiometer.

According to the invention, the potentiometer assembly is greatly simplified by providing the nut and the contact spring with a protrusion and recess coupling which readily engage with and couple to each other.

In practice, the nut is formed, as by molding, of strong elastic polymer material and is provided with at least one coupling protrusion which enters into a conforming coupling opening or recess within a transverse coupling sheet section of a U-shaped contact spring having two contact arms which slide along and contact the resistance and contact tracks, respectively.

The foregoing and other objects of the invention will be further explained in the following description of examples thereof in connection with the annexed drawings wherein:

FIG. 1 is a cross-sectional view of the miniature potentiometer along lines 1—1 of FIG. 2;

FIG. 2 is a cross-sectional view along lines 2—2 of FIG. 1;

FIG. 2A is a cross-sectional view along line 2A—2A of FIG. 1;

FIG. 3 is a perspective view of the potentiometer nut;

FIG. 4 is an exploded perspective view of the same nut structure and of the sliding contact spring moved thereby;

FIG. 5 is a perspective view of the housing base wall of the potentiometer with the parallel resistance and contact tracks carried thereon, and of the U-shaped contact spring held in sliding engagement with the two tracks;

FIGS. 6A, 6B, 6C, 6D and 6D-1, 6E, 6F and 6G are schematic view of successive stages or steps of assembling the components of the potentiometer into completed units.

FIGS. 1 and 2 show an example of a miniature spindle potentiometer exemplifying the invention with some of its components or parts being shown in FIGS 2A and 3 to 5. The potentiometer has a mounting surface 20 with which it is affixed, for example, to the flat surface of a printed circuit device (not shown) indicated by dash-dot lines 20-A. The potentiometer comprises an elongated spindle 1 having exterior threads 1-2 and extending generally parallel to mounting surface 20. The spindle 1 is rotated about its axis and has exterior threads 1-3 engaging inward threads 1-3 of nut 2 for moving the nut 2 between opposite end positions along the spindle 1 (FIG. 1).

The nut 2 has a slot or slots 3 which separates it into two nut sections or cheeks 5 having the inward threads 2-3 which maintain play-free engagement with the spindle threads 1-3. The nut or nut structure 2 is formed, as by molding, of elastic insulating material which causes elastic biasing of the two nut sections 5 into the required play-free and positive threaded engagement with the spindle 1. Furthermore, the elastic nut material causes the engaged nut threads 2-3 and spindle threads 1-3 to axially glide over and across each other in the direction of the spindle axis without damage and wear of the nut threads even during rotation of the spindle 1 at substantial speed, for instance, while the nut 2 remains stationary in an end position along spindle 1. When released from the spindle, the thread diameter of the nut 2 or nut cheeks 5 is smaller than the thread diameter of the spindle 1. Such elastically biased nut sections 5 enable play-free threaded engagement of the spindle 1 with the nut 2, by inserting or pushing the spindle 1 in its axial direction between the inwardly biased nut sections 5 without damage or wear of the nut threads 5-3.

Within the space of the lateral width or diameter of spindle 1 and laterally adjacent thereto are mounted and aligned an elongated resistance track 8 and an elongated metallic contact track 9, both extending parallel to each other and to the spindle 1 and generally perpendicularly or transversely to the mounting surface 20 of the potentiometer.

The potentiometer spindle 1 and all its other components are confined within a space of small transverse profile of narrow width approaching the small profile and width of spindle 1.

All potentiometer components are enclosed in an elongated narrow housing 10 having a transverse profile and width approaching the profile and width of the spindle 1. The housing 10 may, for example, have a profile width of 5 mm. (millimeter) or even smaller. The housing 10 is made of known strong plastic or polymer material which is fully or at least partially transparent to enable visual observation of the proper mounting and operation of potentiometer components in its interior. The housing 10 has sidewalls 10-1 which are parallel and transverse to walls 10-2, 10-3 which are transverse to the spindle 1. The housing 10 is shown with an open bottom side which is enclosed by a base wall 10-6 having a border facing the border of the open housing sidewalls 10-2 and transverse wall 10-3. After assembling the potentiometer components within the housing 10, its border is united or affixed to the facing border of base wall 10-6 to provide a junction which suppresses entry of dust and other contaminants into its interior. Such junction between the border of housing 10 and its base wall 10-6 may be secured as by supersonic vibration for welding within other known procedures.

Housing base wall 10-6 has the exterior mounting surface 20 and carries a transverse interior support wall 10-8. Interior support wall 10-8 carries the elongated resistance track 8 and metallic contact track 9 parallel to each other and transversely to mounting surface 20. Transverse support wall 10-8 is formed of high-quality insulating material, for example, of substantially pure aluminum oxide having good heat conductivity and good heat distribution characteristics. Base wall 10-6 has a major raised interior wall layer extending into the housing interior. Transverse support wall 10-8 has opposite end surfaces 10-9 which are aligned with the longitudinal end edges of the most interior surfaces of base wall 10-8 for aligning the operative position of transverse support wall 10-8 with base wall 10-6 and all the components of the potentiometer held assembled thereon. The resistance track 8 has two opposite metallic terminal end surfaces 8-2 held aligned on transverse support and base walls 10-8 and 10-6 (FIG. 5).

The nut structure 2 is coupled or connected to and aligned with metallic contact spring 7 and imparts thereto sliding contact motion along the resistance and contact tracks 8, 9 between their opposite end positions along spindle 1. Contact spring 7 (FIGS. 1, 2, 4 and 5) is formed of U-shaped sheet structure of spring sheet metal and has two opposite contact arms 7–2 extending from intermediate flat junction section 7–4. The opposite contact arms 7–2 of contact spring 7 are biased into sliding contact engagement with resistance track 8 and contact track 9 while being moved by nut 2 between opposite end positions along spindle 1. In accordance with the invention, the assembly and coupling between nut 2 and contact spring 7 is simplified by providing the insulating nut with one or more coupling projections 6 which enter and fit into recesses or openings 7–6 of junction section 7–4 of U-shaped spring structure 7.

Base wall 10–6 has embedded therein, as by molding, oppositely biased portions of elongated connector strips 33, 34, of elastic and electrically conducting material, such as spring sheet metal. Each connector strip 33, 34 has an outward terminal extension for connection to associated operating circuits. The major inward length of connector strips 33 are biased into contact engagement with terminal ends 8–2 of resistance track 8, and corresponding inward opposite connector strip 34 is biased in opposite direction into contact engagement with contact track 9. These two oppositely biased connector strips 33, 34 are of sufficient strength and stiffness to maintain between them transverse support wall 10–8 with its resistance and contact tracks 8 and 9 aligned in the required operative position on base wall 10–6. The arcuately shaped contact ends of contact arms 7–2 will ride over and make contact with connector strip 34 and therethrough with contact track 9.

One end of the spindle 1 is provided with a spindle head 12 having a slot 13 engageable by a rotating drive element tool such as or resembling a screwdriver, for rotating the spindle 1 around its axis. The transverse housing walls 10–2, 10–3 have recesses or openings for rotatably seating cylindrical end regions of spindle 1. Transverse housing wall 10–3 has a housing extension 11 surrounding the spindle head 12 for suppressing lateral escape of the rotary tool from engagement with the spindle head 12 while rotating the spindle 1. The inward surfaces of the housing extension 11 are purposely roughened so that they form, with the spindle head 12 and adjoining spindle portion, a labyrinthine packing which suppresses entrance of dust and other contaminants into housing 10.

In the form seen in FIGS. 1, 2 and 3, the left end of spindle 1 near its head 12 may have a bearing recess holding therein, for resistance, an annular row of known spherical bearing balls on which the surrounded unthreaded cylindrical spindle portion rotates. The left transverse housing wall 10–3 has a cylindrical opening through which the spindle 1 is inserted into the interior housing position seen in FIGS. 1 and 2, so that its smooth, cylindrical spindle portion to the left of the bearing balls fits within the cylindrical opening of this transverse wall 10–3. The spindle head 12 is separated from the adjoining unthreaded cylindrical spindle portion by a retainer slit which is engaged by the slotted upper end of a retainer spring strip 19 (FIG. 6) which is inserted therein in an upward direction through a slit in the exterior housing extension 11 for locking the spindle 1 in its operative position (FIGS. 1, 6F).

The nut 2 is so designed in relation to the contact spring 7 and the adjoining components including the housing 10 as to force the nut 2 to move longitudinally parallel to the axis of spindle 1 and prevent the nut 2 from being rotated by rotation of spindle 1. Such longitudinal movement of the nut 2 is secured by making its exterior surfaces in the shape of a rectangular parallel piped or of a cube stretched to have the longer rectangular exterior wall surfaces in the directions parallel to the spindle axis. Furthermore, the transverse junction section 7–4 of the U-shaped contact spring 7 is flat and of rectangular shape and fits within a corresponding rectangularly shaped flat recess 2–5 of nut 2 (FIGS. 2 to 5). The U-shaped contact spring 7 is coupled by separated recesses in openings 7–6 of its flat junction section 7–4 to corresponding coupling pin projections 6 of nut 2, thereby preventing rotation of nut 2 and forcing it to move longitudinally parallel to the spindle 1. The most exterior surfaces of nut 2 are flat and they are rectangularly aligned relative to each other. These rectangularly inclined most exterior surfaces of nut 2 face and are guided by interior surfaces of the facing walls of housing 10 and the upper surface of interior support wall 10–8 which prevent rotation of nut 2 and cause it to move longitudinally along spindle 1 by rotation thereof.

Without thereby limiting the scope of the invention, but in order to enable ready practice thereof, there are given below characteristic data of strong elastic materials suitable for making the slotted nut 2 used in the potentiometers of the invention. As examples, they comprise acetal homopolymers (DELRIN), acetal copolymers (CELCON) and long-chain amide polymers, known as nylons, such as described in MODERN PLASTICS ENCYCLOPEDIA, 1967, published by McGraw Hill Publications, pages 110 to 144, 204 to 210 and 111 and the references listed therein. This publication also gives mechanical characteristics of these materials in the Charts on pages 39 to 56, including their tensile strength, tensile modulus, compressive strength, flexural strength, impact strength, flexural modulus and compressive modulus. The characteristics of acetal polymers (DELRIN) are given in the pages inserted after page 156 by Du Pont de Nemours & Co., page 6 of the insert. Also, other known mechanically strong and elastic polymers, for example, polycarbonates, polyesters. Also, such polymers which are combined with fillers or additions, such as glass fibers, or fluorocarbon polymers, such as polytetrafluoroethylene, for example, which secure very material decrease of the frictional coefficient of the combined elastic polymer materials. The transparent housing may be made with known acrylic resins and modified acrylic polymers, such as described in the same publication, pages 115 to 119 and the Chart on page 41.

The present invention also comprises novel methods of producing, in accordance with the invention, miniature spindle potentiometers of the invention on a rapid mass production basis. FIGS. 6A to 6G show schematically examples of a succession of stages, designated stages A to G, respectively, used for such rapid production of potentiometers of the invention.

STAGE A (FIGS. 6A; 6A–1 and FIGS. 1 to 5)

With known fabrication methods, there is produced the housing base wall 10–6, such as seen in FIGS. 6A, 6A–1, 1, 2 and 5, of plastic or polymer material, with its two sets of oppositely biased connector bars 33, 34 of elastic sheet spring metal, for instance, extending therefrom and partially embedded therein. The upward main regions of connector bars 33, 34 — seen in FIGS. 6A, 6A–1, 1, 2 and 3—are elastically biased to engage and make electric contact with terminal regions 8–2 of resistance track 8 and contact track 9, respectively, carried by transverse support wall 10–8.

STAGE B (FIGS. 6B and 6B–1)

The transverse insulating support wall 10—8 with the resistance track 8 and contact track 9 held affixed to its opposite major surfaces is inserted or forced into its operative aligned position (seen in FIGS. 1, 2 and 5) between the upper elastic sections of the two sets of metallic connector bars 33 and 34 which are biased toward support wall 10—8 and to establish conductive connections with terminal surfaces 8—2 of resistance track 8 and with contact track 9, respectively. The downward surface of transverse support wall is now seated on and aligned with the interior surface of housing base wall 10—6 and forms therewith a unitary self-supporting structure with the components held properly aligned thereon.

STAGE C (FIG. 6C)

The U-shaped contact spring 7 is seated as a rider astride over and on the transverse support wall 10-8 so that contact-spring arms 7-2 (FIGS. 4 and 5) engage and make contact with the opposite major outer conducting surfaces of the resistance track 8 and of the contact track 9 held exposed thereon. Thereupon the nut 2 is seated against upward surface of intermediate junction section 7-2 of U-shaped contact spring 7 with the downward nut coupling pins 6 of nut 2 entering with good coupling fit into openings 14 of contact spring section 7-4, as explained above in connection with FIGS. 1 to 5 and FIG. 6C.

STAGE D (FIGS. 6D, 6D-1 and FIGS. 1, 2, 5)

The major upper part of housing 10—as seen in FIGS. 1 and 2—is seated over housing base wall 10-6 and over all the potentiometer components assembled thereon (FIGS. 6B and 6C, and 1, 2, 5). The downward border of the upper major part of housing 10 is now in contact with the facing border of base wall 10-6 so that they may be later united to each other into an integral housing enclosure.

STAGE 6E (FIG. 6E and FIGS. 1 to 5)

The elongated spindle 1 is inserted (through passage of left transverse housing wall 10-3, as seen in FIG. 1) into the interior of the housing 10 in the direction of the spindle axis. Such insertion causes the teeth 1-3 of spindle 1 to glide over and across the nut threads 2-3 and between the inwardly biased nut sections 5 and assume the inward operative position of the spindle 1, such as described above in connection with FIGS. 1 to 5.

STAGE F (FIGS. 6F, 1 and 2A)

The upper locking fingers of flat locking spring strip 19 is now inserted through locking slit of housing extension 11 into locking engagement with locking groove of spindle 1 (FIG. 2A), with the downward region of locking spring strip 19 flexed outwardly, as seen in FIG. 6F. Upon releasing the flexed downward end of locking spring strip 19, it returns to its normal flat shape seen in FIG. 1, wherein it is retained along the exterior of transverse housing wall 10-3 and maintains the spindle 1 locked in the desired final operative position within housing 10.

STAGE 6G (FIGS. 6G and 1)

With all potentiometer components now fully assembled in operative positions within housing 10, the potentiometer is subjected to testing and approval. Upon approval, the downward border of upper housing parallelepiped 10 (as seen in FIG. 1) is joined, as by supersonic vibration welding, to facing border of base wall 10-6 to form therewith a solid junction and integral housing enclosure which suppresses entry of dust, liquids and other contaminants into the housing interior. This completes the production of the miniature spindle potentiometer in accordance with the invention.

SUMMARY

Summarizing, the rapid and simplified production of miniature spindle potentiometers in accordance with the invention is made possible by novel, multisectional nut 2 of strong, elastically deformable and wear-resistant insulating plastic or polymer material. Such multisectional nut 2 of strong, elastically deformable material, which normally maintains substantially play-free engagement of it nut thread teeth 2-3 with the spindle thread teeth 1-3, departs from the long accepted practice in the construction of such or analogous spindle potentiometers. The strong, wear-resistant and elastically deformable insulating material of the multisectional nut 2, causes the teeth of its nut threads 2-3 to glide axially across and over the teeth of the spindle threads 1-3 in a direction parallel to the spindle axis 1 without damage or substantial wear of the nut threads 2-3 during the long operating life of the potentiometer. As a result, the nut threads 2-3 will glide without damage and substantial wear over and across the spindle threads 1-3 in a direction parallel to the spindle axis 1 when the nut 2 remains stationary in an end position while the spindle 1 continues to rotate at substantial speed. Making transparent at least parts of housing 10 adjoining the spindle (and its nut 2) enables visual checking of the momentary potentiometer setting during a long operating life.

The examples of the best mode for carrying out the invention described above will suggest various modifications within the scope of the accompanying claims.

We claim:

1. A narrow elongated spindle potentiometer having a mounting surface affixable to an electrical device,
   an elongated resistance track extending generally transversely to said mounting surface,
   an elongated spindle having exterior threads and extending generally parallel to said track,
   a nut structure having two nut sections separated by a slot with each nut section having inward threads engaging said exterior spindle threads and moved by rotation of said spindle between spaced end stations along said spindle,
   a contact structure having contact elements slidably engaging said resistance track and connected to and moved by said nut structure along said track,
   said nut structure containing insulating elements and also elastic nut elements elastically biasing said inward nut threads into engagement with said spindle threads;
   said elastic elements biasing said inward nut threads into engagement with said exterior spindle threads and causing said spindle threads and said nut threads to glide over each other under relative axial movement between said nut structure and said spindle;
   said nut structure having the property of maintaining the shape of said inward nut threads after many repeated axial gliding movements of said inward nut threads and said spindle threads over each other;
   said spindle and said resistance track extending adjacent each other at different spacings from said mounting surface and being confined within a narrow profile approaching the width of said spindle with said movable nut structure seated thereon;
   an elongated housing enclosing said spindle with said nut structure and said resistance track and having side walls extending along their said narrow profile;
   said housing having a transverse wall with a passage through which said spindle is inserted into the interior of said housing and axially into engagement with the inward threads of said nut structure;
   said spindle having a spindle end region extending through said transverse wall passage to the exterior of said housing, said transverse housing wall having a housing extension surrounding the spindle end region and constituting with said spindle end region a labyrinthine packing suppressing entry of contaminants into the housing interior.

2. A spindle potentiometer as claimed in claim 1,
   said contact structure comprising a U-shaped sheet structure of electrically conducting spring material,
   said nut structure having a coupling projection extending toward said contact structure,
   said contact sheet structure having a coupling sheet section with a coupling recess fitting in coupling engagement with said coupling projection and causing said contact structure to move with said nut structure along said spindle.

3. A spindle potentiometer as claimed in claim 1,
   said contact structure being a U-shaped sheet of spring material having contact elements biased into sliding contact engagement with said resistance track.

4. A spindle potentiometer as claimed in claim 1,
   said potentiometer also comprising an elongated contact track extending generally parallel to said resistance track within said housing and at a spacing corresponding to the spacing of said resistance track from said mounting surface.

5. The method of producing a spindle potentiometer having
  i. an elongated threaded spindle along the interior of one wall of an elongated housing having a profile of minimum area and of a width approaching the width of said spindle, and comprising further
  ii. a nut of strong elastic polymer material having two nut sections separated by a slot and elastically biased into threaded engagement with and movement along said spindle in response to spindle rotation,
  iii. an elongated resistance track and an elongated electrically conducting contact track extending adjacent and parallel to each other and to said spindle and transversely to said one wall within said housing, and
  iv. a U-shaped contact spring moved by said nut and formed of elastic, electrically conducting sheet material having opposite contact arms biased into sliding engagement with said resistance and contact tracks;
  said method comprising
    a. forming said one wall with said resistance track and said contact track extending transversely to and along the interior of said one wall,
    b. thereafter seating said contact spring with said opposite contact arms astride of said two tracks and in engagement with said two tracks, and with said nut seated and coupled to an intermediate section of said contact spring,
    c. thereafter positioning the remainder of said housing over the interior of said one wall and around said above specified elements (ii), (iii) and (iv) assembled along said one wall, and
    d. thereafter pushing said elongated spindle into the interior of said housing, and into threaded engagement with and between said two nut sections while held along said two tracks, and
    e. thereafter bonding the borders of said one wall and said remainder of said housing to each other to close said housing along said borders.

6. The method of producing a spindle potentiometer having
  i. an elongated threaded spindle along the interior of one wall of an elongated housing having a profile of minimum area and of a width approaching the width of said spindle, and comprising further
  ii. a nut of strong elastic polymer material having two nut sections separated by a slot and elastically biased into threaded engagement with and movement along said spindle in response to spindle rotation,
  iii. an elongated resistance track and an elongated electrically conducting contact track held adjacent and parallel to each other and to said spindle and transversely to said one wall within said housing, and
  iv. a U-shaped contact spring moved by said nut and formed of elastic, electrically conducting sheet material having opposite contact arms biased into sliding engagement with said resistance and contact tracks;
  said method comprising
    a. producing said one wall of insulating material with at least two opposite sets of elongated, strong and elastic connectors extending from and transversely to said one wall,
    b. thereafter inserting said parallel resistance and contact tracks between and into engagement with said opposite sets of connectors,
    c. thereafter seating said contact spring with said opposite contact arms astride and over and in engagement with said resistance and contact tracks and coupling said nut to said contact spring, and
    d. thereafter positioning the remainder of said housing over the interior of said one wall around and over said above specified elements (i), (ii), (iii) and (iv),
    e. and thereafter pushing said spindle through a housing wall into the operative position in the interior of said housing and into threaded engagement with and between said nut sections.

7. The method of producing a potentiometer as claimed in claim 6,
  said method comprising, after step (d), the further step of
    d-1. testing the operation of the potentiometer components (i), (ii), (iii) and (iv) assembled in said housing and, after step (e), the further step of
    f. thereafter bonding the borders of said one wall and of said remainder of said housing into a joint suppressing entry of dust into the interior of said housing.

* * * * *